Figure 1:
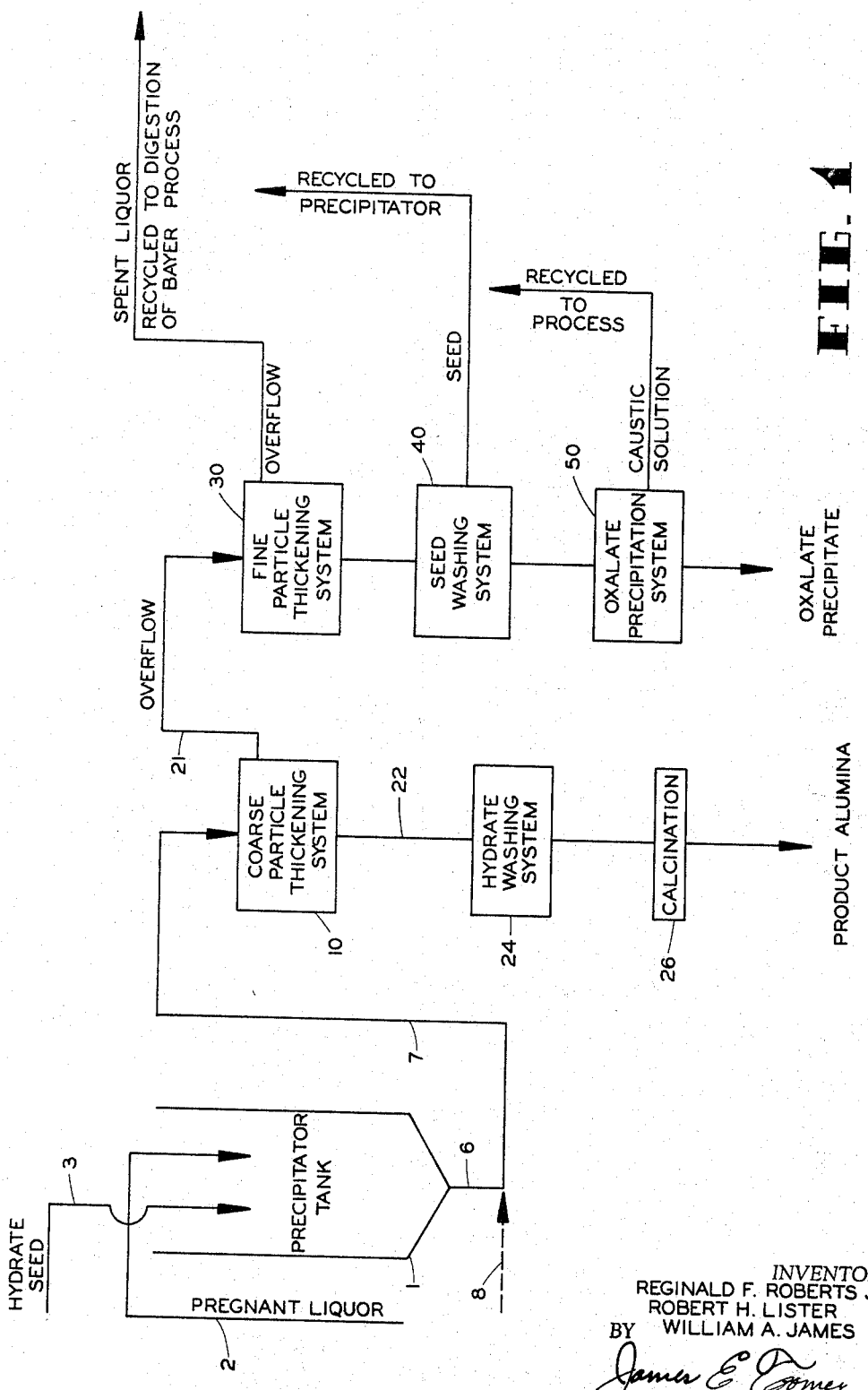
Figure 2:
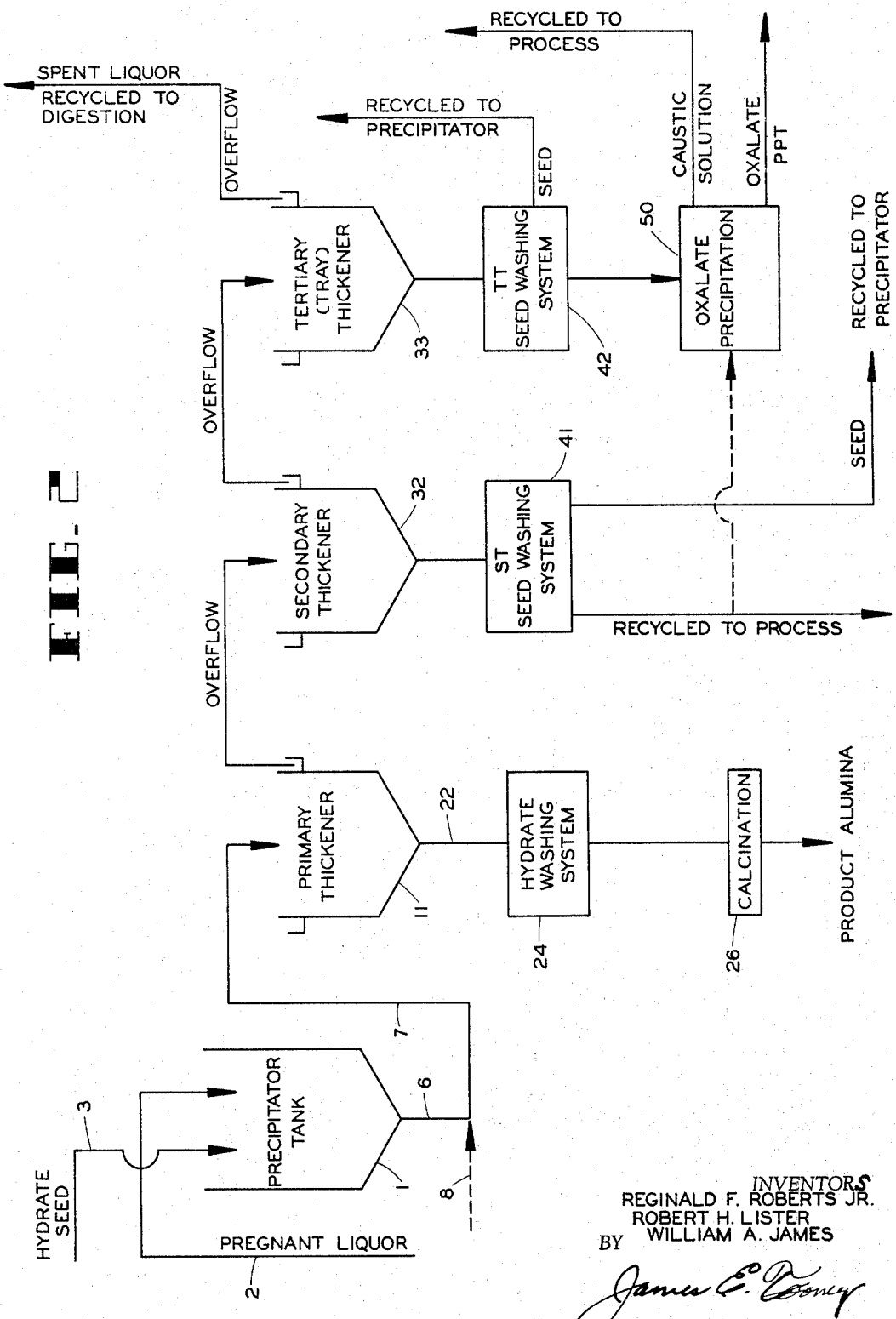

INVENTORS
REGINALD F. ROBERTS JR.
ROBERT H. LISTER
WILLIAM A. JAMES

United States Patent Office 3,372,985
Patented Mar. 12, 1968

3,372,985
PROCESS FOR REMOVING IMPURITIES FROM THE PRECIPITATION SYSTEM OF THE BAYER PROCESS
Reginald F. Roberts, Jr., and Robert H. Lister, Baton Rouge, La., and William A. James, Toronto, Ontario, Canada, assignors to Kaiser Aluminum and Chemical Corporation, Oakland, Calif., a corporation of Delaware
Continuation of application Ser. No. 259,826, Feb. 20, 1963. This application June 5, 1967, Ser. No. 645,544
10 Claims. (Cl. 23—143)

This invention relates to a process for the removal of water soluble compounds, such as oxalate salts, from the precipitation system of the Bayer process. More particularly, the invention relates to a process for the removal of oxalate contaminant from precipitated alumina hydrate prior to recycling the hydrate as seed for the precipitation system. Further, the invention also presents a method for the rectification or conversion of the removed oxalate for the recovery of caustic.

This application is a continuation of Ser. No. 259,826 filed Feb. 20, 1963 and now abandoned.

The precipitation of alumina from clarified caustic aluminate liquors can be accomplished in both batch and continuous precipitation systems. In batch precipitation, pregnant liquor is passed to a large tank, the liquor is seeded and precipitation continues in the same tank for a predetermined period of time with agitation of the slurry during precipitation. The contents of the tank are then removed and the precipitated alumina hydrate is removed from the liquor. The liquor remaining, referred to as spent liquor, is recycled to the digestion steps of the Bayer process after reconcentrating and addition of makeup caustic. The alumina hydrate recovered is classified into product and seed. In a continuous system, pregnant liquor is treated in a series of interconnected tanks through which the pregnant liquor flows. In each tank, precipitation of alumina hydrate is taking place. Examples of continuous precipitation systems are those shown by Cowles in Patent 1,943,786 and Harms in Patent 2,606,820.

The manner in which seed is added to the pregnant liquor and the character of the seed has a definite effect upon the particle size and settling characteristics of the product. In both batch and continuous systems, the practice is to charge the seed into the precipitators as a slurry or suspension in caustic liquor, for example, spent caustic liquor. This is the condition in which the classified fine hydrate is normally recovered from the classification system. This method gives a relatively fine and slow settling precipitation product.

The caustic liquor used as the medium to carry the seed to the pregnant liquor is liquor which has passed through the precipitation and classification stages, and usually has had about half of the alumina precipitated therefrom. The bulk of the spent liquor is returned to the initial digestion step after replenishing amounts of caustic have been added thereto, and contains various types of organic matter introduced into the liquor stream during processing.

Most of this organic matter is a complex mixture of solubilized or dissolved organic substances, including salts, which are formed in the caustic liquor from the organic matter, such as the humus, present in the aluminous ore, and from starch which is employed as a flocculating agent in removing the red mud residue of the ore from the liquor. The process liquor is thus contaminated with these organic substances. These organic materials are present in various forms from complex high molecular weight compounds to more or less ultimate products, since they are molecularly degraded by the caustic and high temperatures employed in the process to such lower molecular weight compounds as oxalates, glycolates, acetates, and inorganic carbonates. In the usual practice of the Bayer process, caustic soda is used for bauxite digestion; and in this instance, the aforementioned compounds would be sodium compounds. However, other alkali materials or caustics, such as potassium hydroxide, could be used for bauxite digestion and the instant invention also pertains to the organic substances formed in these systems.

The more or less ultimately degraded organic materials in solution are to be collectively referred to hereinafter, in specification and in the claims, as "oxalate" or "sodium oxalate," since this fraction of organic materials in the liquor (as determined by a potentiometric titration with perchlorato-cerate in perchloric acid solution) is collectively reported as sodium oxalate. In addition, this sodium oxalate fraction of the organic matter in the liquor is the one with which the present invention is mainly concerned. It is to be understood, however, that the term is inclusive of other forms of organic matter content in the liquor having an effect similar to the oxalate, whether identified or not. The sodium oxalate is precipitated from the liquor as very fine particles at the temperatures and caustic soda concentrations of the liquor in the alumina precipitation phase. They provide active surface sites for the nucleation of alumina hydrate particles and/or retard the agglomeration or growth of alumina hydrate particles thereby resulting in an undesirably fine and slowly settling alumina hydrate precipitate.

According to the instant invention sodium oxalate is removed from the seed fractions, usually the finer fractions, of the alumina hydrate particles prior to using these particles as seed in the precipitation reaction. The alumina hydrate particles are subjected to a water washing to dissolve substantially all the sodium oxalate present. The removal of the sodium oxalate contaminant from the seed fraction alumina hydrate promotes better particle size control in the precipitation, increased capacity of the precipitation system, more efficient operation of the classification system, a purer seed hydrate, and a purer product alumina. The invention also provides for treating the oxalate-rich washings to precipitate oxalate which can be further processed and to recover caustic soda which may be recycled in the process.

Other features and advantages will become apparent from the ensuing disclosure.

It has been discovered that under the conditions present during the precipitation phase of the Bayer process, the liquor is supersaturated with respect to sodium oxalate as well as dissolved alumina. The oxalate solids present in the seed promote the formation of a finely divided alumina hydrate precipitate, and this problem is particularly acute in the processing of bauxites having a high organic carbon content, such as Jamaican bauxites.

As a consequence, the classification operation for separating the alumina hydrate particles from precipitation into size fractions reveals that the finer fractions are high in sodium oxalate whereas the coarser fractions are substantially lower in sodium oxalate. This association of the sodium oxalate crystals with the finer fractions of the alumina hydrate permits the removal of the major part of the solid sodium oxalate by treating only a portion of the alumina hydrate particles, namely, the finer fractions, which fractions are used as seed.

In the American Bayer process practice, the alumina precipitation phase is normally operated batchwise with the holding time varying for any one batch operation according to the demands of the plant. Usually, however, the retention time is about 25 to 55 hours. On the other hand, the hydrate classification system is normally con- 3,372,985

3,372,985 spent caustic liquor, the primary filtrate, which can be recycled in the process. (Alternatively, a centrifuge could be employed in place of the rotary belt filter 70.) The filter cake from filter 70 is subjected to agitation in dissolving or leaching tank 71 with hot water, preferably at a temperature of 50° to 90° C., to dissolve the oxalate. The resulting slurry is then filtered on a second rotary belt type filter 72 after which the filter cake is again washed with water to remove substantially all of the dissolved oxalate. The washed seed is fed to a repulper wherein the seed is reslurried with liquor and returned to precipitation. The filtrate from filter 72 is oxalate-rich and can be discarded or suitably treated, (for example, by adding caustic soda to precipitate sodium oxalate, or lime to precipitate calcium oxalate with the recovery of caustic, or by evaporation to precipitate sodium oxalate as previously discussed).

Figure 3:
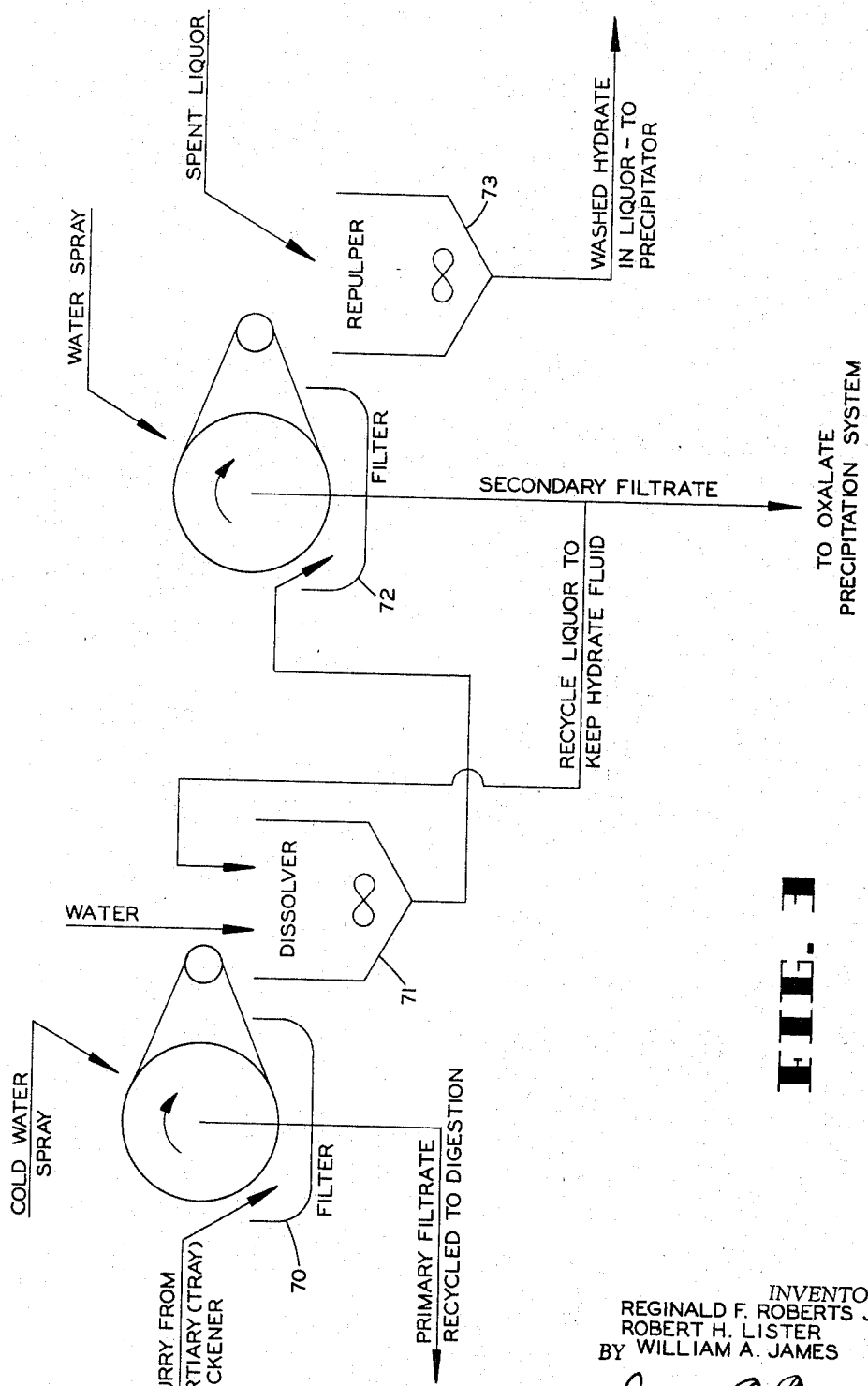

In extensive testing of washing, tertiary (tray) thickener hydrate in a system such as that depicted in FIGURE 3, it has been found that alumina hydrate particles containing 0.4 to 6.5% by weight of sodium oxalate can be washed to yield a washed alumina seed having only 0 to 0.25% by weight of sodium oxalate. The secondary filtrate from filter 72 will contain on the order of 6–32 g./l. sodium oxalate.

Figure 4:
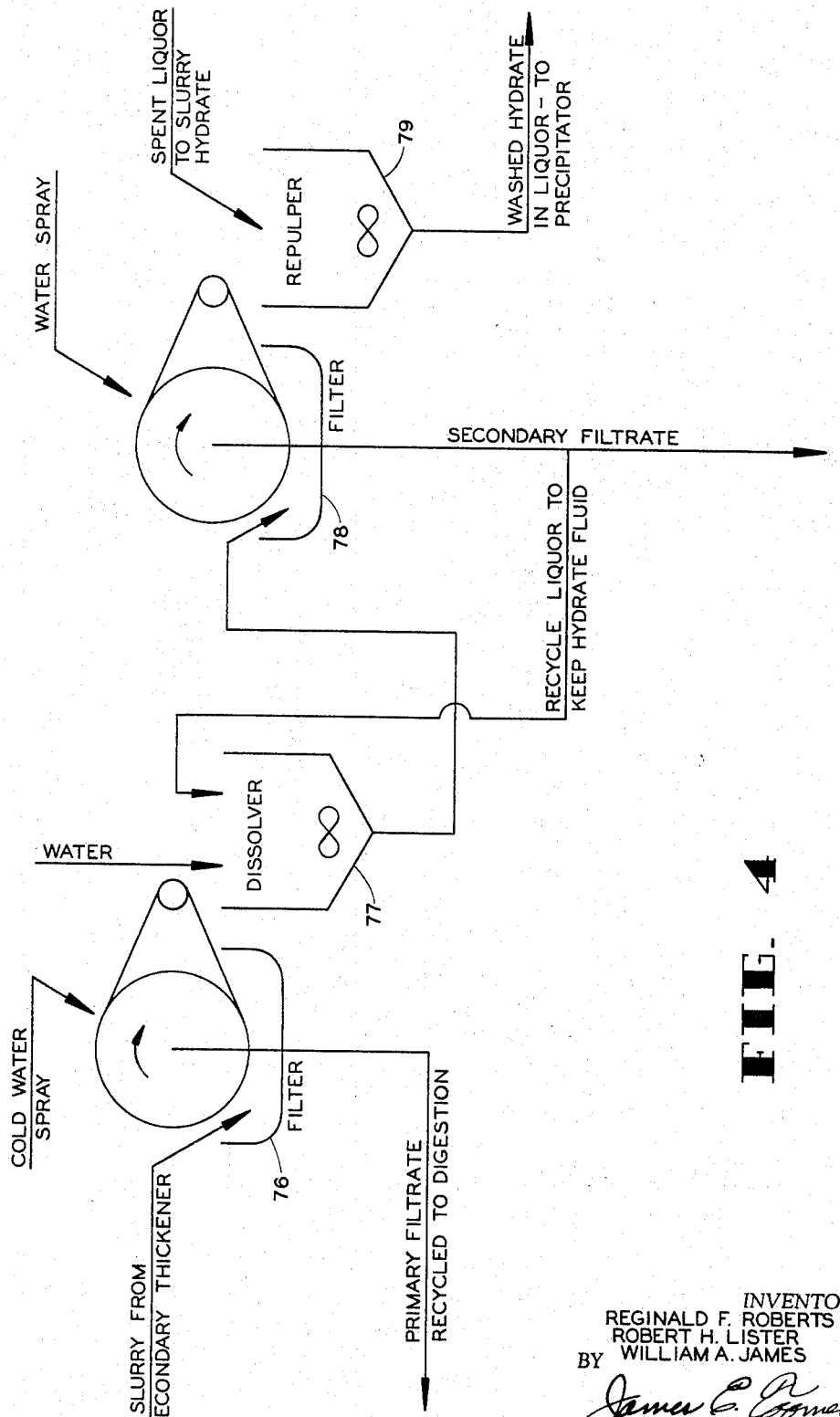

FIGURE 4 shows diagrammatically a feed washing system and procedure for washing the alumina hydrate particles in the secondary thickener (ST) underflow. The underflow from the secondary thickener is fed to a rotary belt filter 76 wherein the spent liquor is removed from the ST seed until the cake contains approximately 80% solids by weight. A water spray washes the filter cake with water, preferably cold water, e.g., less than 32° C. The amount of water used is preferably just sufficient to remove substantially all the spent caustic liquor, the primary filtrate which can be recycled in the process. The filter cake from filter 76 is subjected to agitation in dissolving or leaching tank 77 with hot water, preferably at a temperature of 50° to 90° C. to dissolve the oxalate. The resulting slurry is then filtered on a second rotary belt-type filter 78 after which the filter cake is washed with water. The washed seed is fed to a repulper 79 wherein the seed is reslurried with liquor and returned to precipitation. The filtrate from filter 78 contains the oxalate and can be discarded or suitably treated as similarly described for FIGURE 3. In some instances of operation, the filtrate from filter 78 is not sufficiently high in oxalate to warrant treatment to precipitate the oxalate. The filtrate may, if desired, be recycled to the mud washing system or to the starch preparation system in the Bayer process.

In extensive washing tests of secondary thickener hydrate in a system such as that depicted in FIGURE 4, it has been found that with secondary thickener hydrate containing 0.1 to 2.0 weight percent of sodium oxalate the sodium oxalate can be reduced on the washed hydrate to 0 to 1% by weight. The secondary filtrate from filter 78 will contain on the order of 5 to 15 g./l. sodium oxalate.

Figure 5:
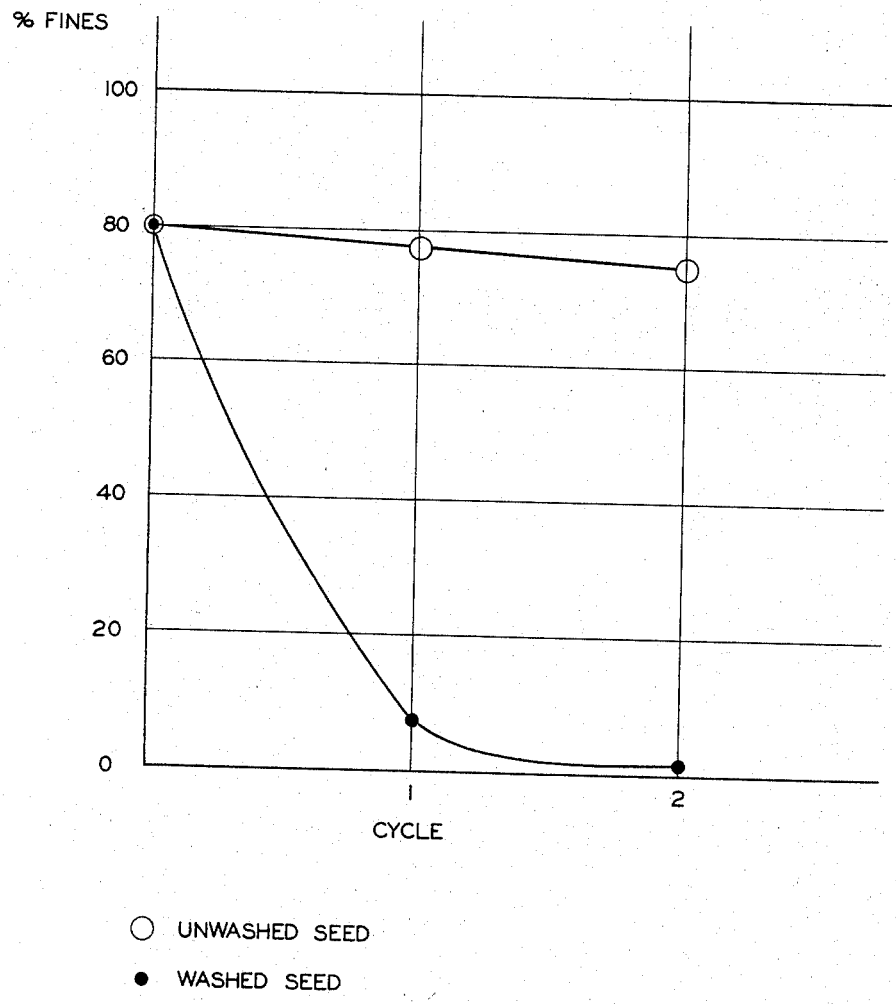

FIGURE 5 is a chart showing the precipitation results of test work using untreated pregnant liquor with washed and unwashed seed. In these tests the results of seeding pregnant liquor with unwashed seed were compared with seeding pregnant liquor with washed seed. At the end of the precipitation step (end of cycle 1 in FIGURE 5) the total seed bed (seed plus product) was sampled and weighed. In the case of the unwashed seed there was essentially no growth of the alumina hydrate particle whereas the growth in the case of the washed seed was very substantial; as indicated in FIGURE 5 the fines had decreased from about 80% to 8%. The spent liquor from the first cycle was then adjusted with bauxite to simulate plant conditions and again used as pregnant liquor for the second cycle. The proportionate amount of seed from the first precipitation cycle was used as seed for the second cycle. Again, in the case of the unwashed seed, no substantial amount of growth of the alumina hydrate particles were shown whereas the fines in the seed bed in the washed seed precipitate was reduced to 2%, which clearly shows the efficacy of the instant invention in promoting growth of the alumina hydrate particles during precipitation.

It is to be understood that various changes and modifications may be made in the foregoing method invention without departing from the spirit of the invention and the scope of the appended claims. Although the invention is described in particular in regard to removal of oxalate from alumina hydrate seed particles, the invention should not be construed as limited thereto. The practice of the invention may additionally remove other substances that are also deleterious to the making of product alumina.

We claim:

1. In the Bayer process wherein alumina is extracted from aluminous material by digesting said aluminous material in a caustic liquor and said extracted alumina is precipitated from pregnant caustic liquor containing oxalate as a contaminant, which oxalate also precipitates and contaminates the precipitated alumina hydrate, and the precipitated solids are separated from the major portion of the mother liquor after which the concentrated solids-containing slurry is classified according to particle size into product alumina hydrate and alumina hydrate seed for recycle to the aforesaid precipitation, the improvement in particle size control and increased capacity of precipitation comprising separating the spent caustic liquor from the alumina hydrate seed by filtering and subjecting the alumina hydrate filter cake to cold water washing, the amount of cold water used being not in excess of that which is sufficient to remove substantially all of the spent caustic liquor remaining in the seed solids, recycling of the spent caustic liquor to the digestion phase of the Bayer process, subjecting the cold-water-washed-alumina hydrate to a washing with hot water to dissolve substantially all of the sodium oxalate contaminant, separating the washed seed from the oxalate-containing wash liquor, and thereafter recycling the washed seed to the precipitation reaction.

2. The process of claim 1 wherein the oxalate-containing liquor is treated to reprecipitate oxalate.

3. The process of claim 1 wherein the oxalate-containing liquor is treated with caustic to reprecipitate sodium oxalate.

4. The process of claim 1 wherein the oxalate-containing liquor is treated with lime in sufficient quantity to causticize the sodium oxalate to obtain recoverable caustic and insoluble calcium oxalate.

5. The process of claim 4 wherein the calcium oxalate is subjected to calcination to regenerate the lime.

6. In the Bayer process wherein alumina is extracted from aluminous material by digesting said aluminous material in a caustic liquor and said extracted alumina is precipitated from pregnant caustic liquor containing oxalate as a contaminant, which oxalate also precipitates and contaminates the precipitated alumina hydrate, and the precipitated solids are separated from the major portion of the mother liquor after which the concentrated solids-containing slurry is classified according to particle size into product alumina hydrate and alumina hydrate seed for recycle to the aforesaid precipitation, the improvement in particle size control and increased capacity of precipitation comprising separating the spent caustic liquor from the alumina hydrate seed by filtering and subjecting the alimina hydrate filter cake to cold water washing, said cold water temperature being not more than about 32° C. and the amount of cold water used being not in excess of that which is sufficient to remove substantially all of the spent caustic liquor remaining in the seed solids, recycling of the spent caustic liquor to the digestion phase of the Bayer process, subjecting the cold-water-washed-alumina hydrate to a washing with hot water to dissolve substantially all of the sodium oxalate contaminant, said hot water being at a temperature from about 50° C. to 90° C., separating the washed seed from the oxalate-containing wash liquor, and thereafter recycling the washed seed to the precipitation reaction.

7. The process of claim 6 wherein the oxalate-containing liquor is treated to reprecipitate oxalate.

8. The process of claim 6 wherein the oxalate-containing liquor is treated with caustic to reprecipitate sodium oxalate.

9. The process of claim 6 wherein the oxalate-containing liquor is treated with lime in sufficient quantity to causticize the sodium oxalate to obtain recoverable caustic and insoluble calcium oxalate.

10. The process of claim 9 wherein the calcium oxalate is subjected to calcination to regenerate the lime.

References Cited

UNITED STATES PATENTS

| | | | |
|---|---|---|---|
| 2,806,766 | 9/1957 | Anderson | 23—143 |
| 2,935,376 | 5/1960 | Roberts | 23—143 |

MILTON WEISSMAN, *Primary Examiner.*

OSCAR R. VERTIZ, *Examiner.*

H. T. CARTER, *Assistant Examiner.*